United States Patent [19]

Tagoku et al.

[11] Patent Number: 4,837,071
[45] Date of Patent: Jun. 6, 1989

[54] INFORMATION DISPLAY MEDIUM

[75] Inventors: Izumi Tagoku, Machida; Harumitsu Mashiko, Yokohama, both of Japan

[73] Assignee: Ricoh Company, Ltd., Tokyo, Japan

[21] Appl. No.: 124,602

[22] Filed: Nov. 24, 1987

[30] Foreign Application Priority Data

Nov. 25, 1986 [JP] Japan .................. 61-280514

[51] Int. Cl.⁴ ............................. B41M 5/26
[52] U.S. Cl. .................... 428/195; 428/187; 428/201; 428/203; 428/204; 428/913
[58] Field of Search ............ 428/13, 14, 195, 201, 428/203, 204, 913, 187; 503/200, 206, 226

[56] References Cited

U.S. PATENT DOCUMENTS 4,268,413 5/1981 Dabisch ................... 252/408

Primary Examiner—Bruce H. Hess
Attorney, Agent, or Firm—Oblon, Fisher, Spivak, McClelland & Maier

[57] ABSTRACT

An information display medium includes as a main component a thermosensitive material layer which can reversibly repeat turbid and transparent conditions by being heated to different temperatures and can keep one of such conditions stably below a particular temperature, one of the turbid and transparent conditions being selectable by a print head. The information display medium further includes a substrate layer combined with the thermosensitive material layer, and another layer, at least one of the thermosensitive material layer, the substrate layer, the other layer, and a background panel for use with the information display medium having a regular pattern such as a stripe or a matrix in a plane thereof, and being colored in at least two colors in the pattern for color display.

8 Claims, 13 Drawing Sheets

F I G. 6
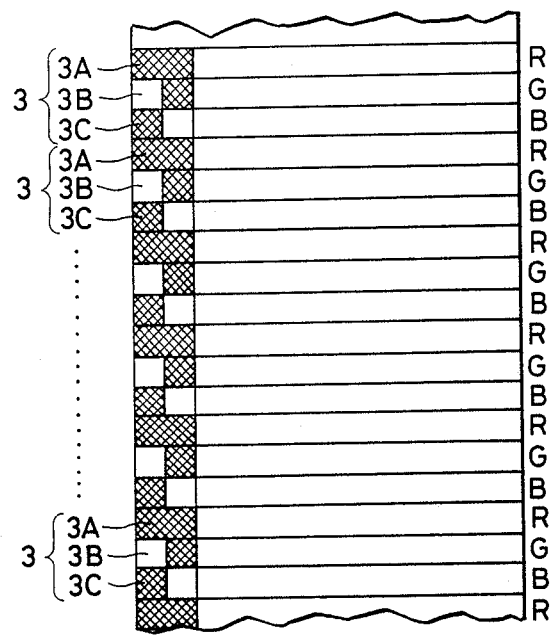
F I G. 7
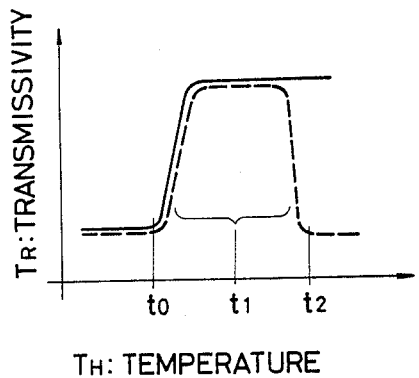

F I G. 20
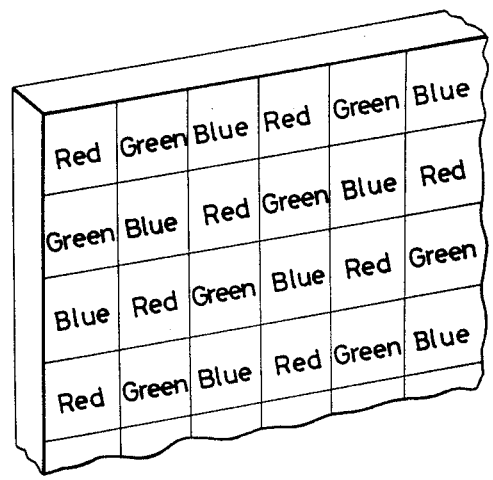
F I G. 21
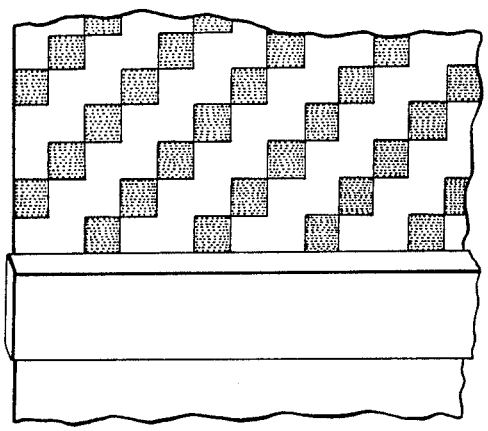

INFORMATION DISPLAY MEDIUM

BACKGROUND OF THE INVENTION

The present invention relates to an information display medium.

It is known in the art that visual information is written on the surface of a display medium such as a film, and the display medium is exposed for display through a display window of a display device.

One display medium used in such an application is a thermosensitive display medium which has a reversible effect such that it can be colored when heated and become colorless upon being cooled, the display medium being made of a chemical material exhibiting hysteresis with respect to temperature. This display medium displays image information based on the phenomenon that two conditions, i.e., colored and colorless conditions can exist simultaneously at a certain temperature. In order to keep image information displayed on the display medium, the display medium has to be kept at such a temperature by being heated or cooled, for example.

Recently, there has been found a thermosensitive material which can reversibly repeat turbid and transparent conditions by being heated to different temperatures and can keep one of such conditions stably below a particular temperature.

This thermosensitive material (hereinafter referred to as a "thermochromic material") is made of a matrix material such as thermoplastic resin and an organic low-molecular material dispersed in the matrix material. If the thermochromic material is heated to a temperature above a particular temperature $t_0$, the condition of the thermochromic material after it has been cooled below $t_0$ varies dependent on the temperature to which the material was heated.

More specifically, as shown in FIG. 7, the thermochromic material has two condition transition areas $t_0-t_1$, $t_1-t_2$ ($t_0<t_1$, $t_1-t_2$) above $t_0$. If the thermochromic material is heated above $t_2$ and then cooled below $t_0$, then the material becomes turbid, cutting off light.

If the thermochromic material is heated to the temperature range indicated by $t_1$ and then cooled below $t_0$, then the material becomes transparent with high transmissivity.

In case the thermochromic material is heated to a temperature between $t_0-t_1$ or $t_1-t_2$, the turbidity of the thermochromic material upon being cooled ranges continuously from a transparent state to a fully turbid state dependent on the temperature to which the material was heated.

In FIG. 7, the solid-line curve represents the light transmissivity of a thermochromic material while being heated which is initially in a turbid state, and the broken-line curve indicates the light transmissivity thereof after being cooled below $t_0$. A thermochromic material which is in a transparent state exhibits the same characteristics except for different transmissivity below $t_1$.

Examples of the thermochromic material are as follows: The matrix material may be one or more of thermoplastic resins such as polyester, polyamide, polyacrylate, polymethacrylate, polystyrene, silicone, polyvinyl chloride, copolymer of vinylidene chloride and vinyl chloride, copolymer of vinylidene chloride and acrylonitrile, and the like.

The organic low-molecular material may be one or more of organic compounds having 10 to 30 carbon atoms, such as saturated or unsaturated monocarboxylic and dicarboxylic acids or their ester, amide and ammonium salt, saturated or unsaturated halogenated fatty acid or its ester, amide and ammonium salt, and aryl carboxylic acid or its ester, amide and ammonium salt. Particularly preferable are linear saturated higher fatty acids such as palmitic acid, stearic acid, arachic acid, and behenic acid, or their ester, amide and ammonium salt.

The thermochromic material represented by the above substances is deposited on a colorless transparent substrate to provide a partial turbid state, and this assembly is constructed as one information display medium.

The assembly is used as one unit, and such assemblies are combined in layers which may be combined with a colored background panel, for example, for displaying image information (see Japanese Laid-Open Publications Nos. 57-92370 and 57-212481, for example).

Where the substrate or the thermochromic material is colored for displaying image information, colored display is made possible. The substrate or the thermochromic material is often colored in a single color. Any display obtained is monotonous since image information cannot be displayed in a combination of different colors based on the property of the thermochromic material.

SUMMARY OF THE INVENTION

It is an object of the present invention to provide an information display medium capable of displaying an image in a combination of colors.

Another object of the present invention is to provide a print head which can select a color of an information display medium for displaying an image in a combination of colors.

Still another object of the present invention is to provide a multicolor display unit comprising a combination of an information display medium and a background panel for displaying an image in a combination of colors.

To achieve the above objects, an information display medium according to the present invention includes as a main component a thermosensitive material layer which can reversibly repeat turbid and transparent conditions by being heated to different temperatures and can keep one of such conditions stably below a particular temperature, one of the turbid and transparent conditions being selectable by a thermal print head, the information display medium further including a substrate layer combined with the thermosensitive material layer, and another layer, at least one of the thermosensitive material layer, the substrate layer, the other layer, and a background panel for use with the information display medium having a regular pattern such as a stripe or a matrix in a plane thereof, and being colored in at least two colors in the pattern.

With the present invention, at least one of the substrate layer the other layer, and the background panel is colored in different color patterns, rather than a uniform color pattern. The temperature of the thermosensitive material layer is controlled for displaying an image in a combination of different colors.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 4 through 6 are plan views of color patterns for information display mediums of the present invention;

FIG. 7 is a graph showing the relationship between temperatures and transmissivities of the information display medium of the present invention;

FIGS. 20 and 21 are fragmentary perspective and plan views of another background panel;

DESCRIPTION OF THE PREFERRED EMBODIMENTS

Figure 1A:
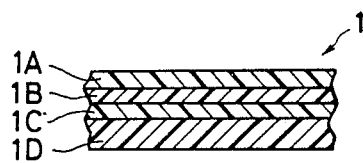
FIGS. 1(A) and 1(B) are fragmentary cross-sectional views of information display mediums according to embodiments of the present invention.

FIG. 1(A) shows in cross section an information display medium 1 according to the present invention.

As shown in FIG. 1(A), the information display medium 1 includes an uppermost protective layer 1A made of a resin to which polyvinyl alcohol, polyester, or fluoro-plastic is added, a thermosensitive layer 1B of a thermochromic material, a colored layer 1C, and a substrate layer 1D disposed beneath the lower surface of the protective layer 1A, these layers being joined together as a laminated structure.

The colored layer 1C is made of a resin, a solvent, paraffin, or the like, or their mixture, in which a desired dye is dispersed. The colored layer 1C is deposited on the substrate layer 1D up to a thickness of several micrometers.

Figure 2A:
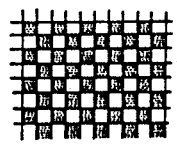
FIGS. 2(A), 2(B), and 2(C) are plan views showing color patterns on colored layers of the information display mediums.
Figure 2B:
Figure 2C:
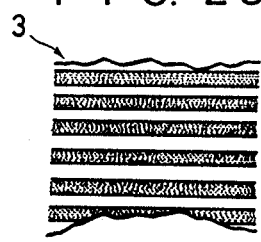

The colored layer 1C has a matrix pattern in its plane as shown in FIGS. 2(A) or 2(B), or a stripe pattern in its plane as shown in FIG. 2(C). The colored layer 1C is colored in two or more colors in the pattern.

In this embodiment, the colored pattern has two colors which are indicated by stippled and blank areas, respectively, in FIGS. 2(A), 2(B), and 2(C).

The substrate layer 1D is in the form of a turbid film such as of nylon, polyester, or the like, which is joined to the lower surface of the colored layer 1C, the substrate layer 1D having a thickness ranging from 20 to 250 micrometers.

Figure 1B:
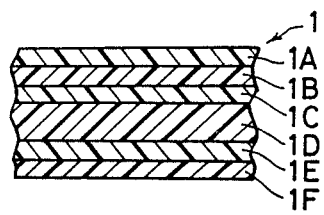
Figure 3A:
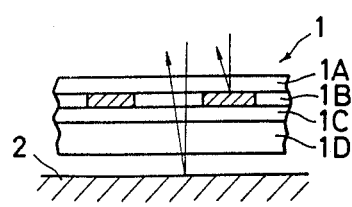
FIGS. 3(A) and 3(B) are fragmentary cross-sectional views showing operation of the information display medium of the present invention.

The substrate layer 1D may be colored itself or may be a transparent member.

Where the substrate layer 1D comprises a transparent film of polyethylene, polyethylene terephthalete, or the like, a white colored layer 1E (FIG. 1(B)) made of a resin in which a white pigment such as titanium, magnesium, or the like is dispersed is joined to the substrate layer 1D, and a protective layer 1F is also joined to the white layer 1E to protect this layer, or alternatively, a guide plate 2 (FIG. 3(A)) disposed near the substrate layer 1D is composed of a white panel.

The colored layer 1C may be fabricated by a process by which a dye and a small amount of resin are dissolved in a solvent, and the solution is printed, a hot-melt process, a solvent dispersing and coating process, or a spray coating process.

Figure 3B:
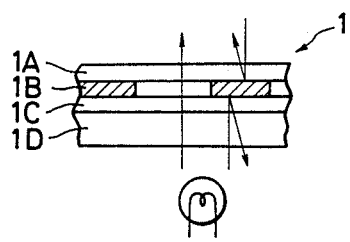

In operation, the information display medium 1 which is initially turbid is heated under control by a print head to form turbid areas (indicated as being shaded) and transparent areas, as shown in FIGS. 3(A) and 3(B).

If a viewpoint is located above the information display medium 1 in order to identify displayed image information through reflected light, as shown in FIG. 3(A), a white image is viewed in the turbid areas irrespective of the presence of the colored layer 1C, and a colored image from the colored layer 1C is viewed in the transparent areas.

If viewpoints are placed respectively above and below the information display medium 1 in order to identify displayed image information through transmitted light, as shown in FIG. 3(B), a colored image from the colored layer 1C is viewed at the transparent areas based on light from a light source, a white image is viewed by the upper viewpoint at the turbid areas, and a colored image from the colored layer 1C is viewed by the lower viewpoint at the turbid areas.

Figure 4:
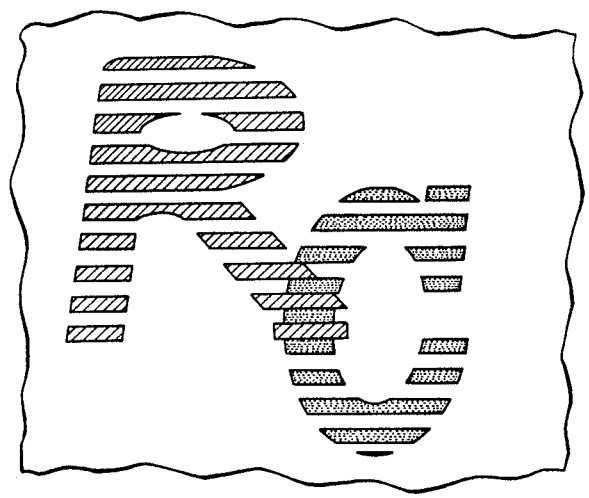

FIG. 4 shows, by way of example, an image displayed in different colors on the image information medium which is scanned along lines by a print head. In FIG. 4, the colored layer has a colored pattern of stripes of different colors which are viewed at the transparent areas.

Figure 5:
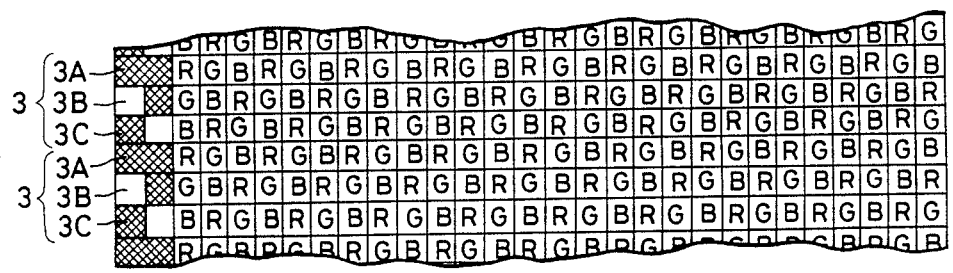

The colored layer may be colored in two or more colors, as described above. FIGS. 5 and 6 illustrate colored layers which are colored in three colors.

In FIG. 5, the colored layer is of a matrix pattern of dots which are colored in three primaries, i.e., red (R), green (G), and blue (B) in horizontal and vertical directions, each of the colored dots being of the same size as that of one pixel of a print head. In FIG. 6, the colored layer is of a pattern of horizontal stripes parallel to each other in the vertical direction, the stripes being colored in red (R), green (G), and blue (B) repeatedly in the vertical direction.

In reality, the vertical direction in FIGS. 5 and 6 corresponds to the longitudinal direction of the information display medium, and the horizontal direction corresponds to the transverse direction of the information display medium.

With the color pattern arrangements shown in FIGS. 5 and 6, image information can be displayed in the three colors by making the thermosensitive layer transparent with the controlled heating by the print head.

If the information display medium is employed as a display medium that can be viewed from a distant point, the pitch of the pattern or fineness of the pattern is selected to be in the range of 3 to 0.5 dots/mm or 0.2 dots/mm for single-color display, and is determined on the basis of 1/n of one dot for n-color display.

According to the multicolor information display medium of the type described above, the thermosensitive material layer should be heated under the control of the print head. Such display control by the print head for color display on the information display medium will be described below.

The information display medium shown in each of FIGS. 5 and 6 has line identification marks 3 for identifying the pattern colors, the line identification marks 3 being positioned on one lateral side of the information display medium.

Each of the line identification marks 3 is composed of two colored columns. The line identification mark 3 includes an area 3A where both of the columns are coated, for indicating that the line has an array of dots of red (R), green (G), and blue (B), which begins with a red (R) dot for the matrix pattern of FIG. 5, or for indicating that the line is a stripe colored in red (R) for the stripe pattern of FIG. 6. The line identification mark 3 also includes an area 3B where the righthand column is coated, for indicating that the line has an array of dots beginning with a green (G) dot for the matrix pattern of FIG. 5, or for indicating that the line is a stripe colored in green (G) for the stripe pattern of FIG. 6. The line identification mark 3 further includes an area 3C where the lefthand column is coated, for indicating that the line has an array of dots beginning with a blue (B) dot for the matrix pattern of FIG. 5, or for indicating that the line is a stripe colored in blue (B) for the stripe pattern of FIG. 6.

Figure 8:
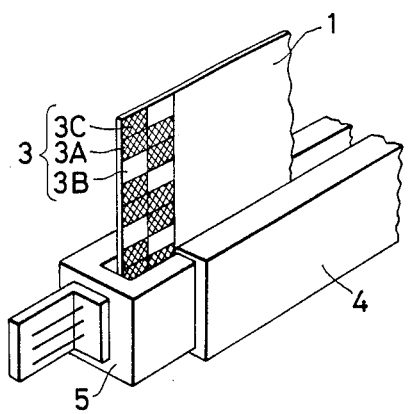
FIG. 8 is a fragmentary perspective view of a mark sensor employed in the operation of the information display medium.

The line identification marks 3 on one side of the information display medium is positionally aligned with a mark sensor 5 (FIG. 8) integral with one side of a thermal head 4 serving as a print head.

Figure 9:
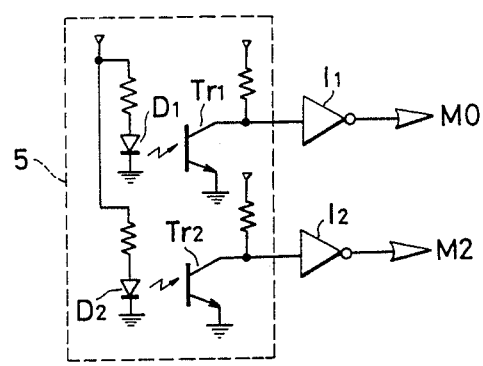
FIG. 9 is a circuit diagram of the mark sensor shown in FIG. 8.

As shown in FIG. 9, the mark sensor 5 comprises a photoelectric transducer composed of light-emitting diodes D1, D2 and phototransistors Tr1, Tr2. Output signals from the phototransistors Tr1, Tr2 are inverted by respective inverters I1, I2, which apply inverted output signals to a color discrimination circuit shown in FIG. 10.

Figure 10:
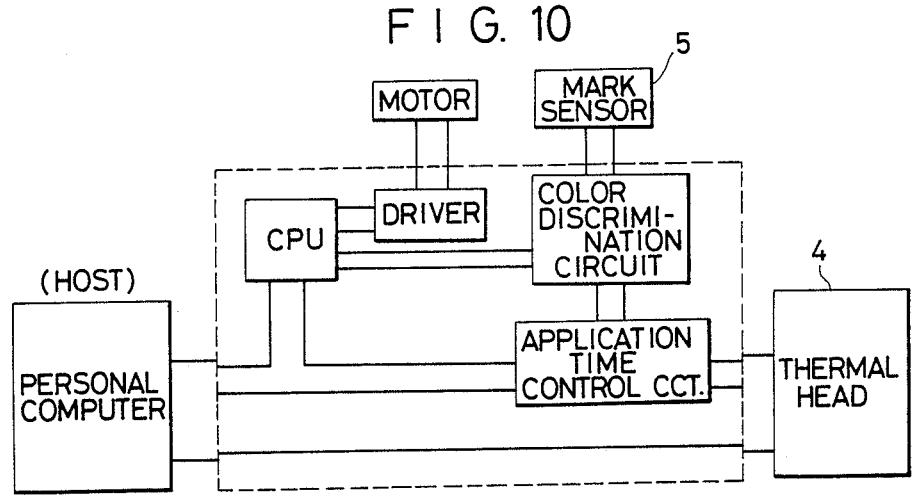
FIG. 10 is a block digram of a print head controller used with the information display medium.

A system or print head controller for controlling the thermal head 4 is constructed as shown in FIG. 10. The print head controller is connected to a host device such as a personal computer and has a driver for a motor, a color discrimination circuit supplied with the output signals from the mark sensor 5, and an application time control circuit for controlling the time in which to apply a signal to the thermal head 4.

Figure 11:
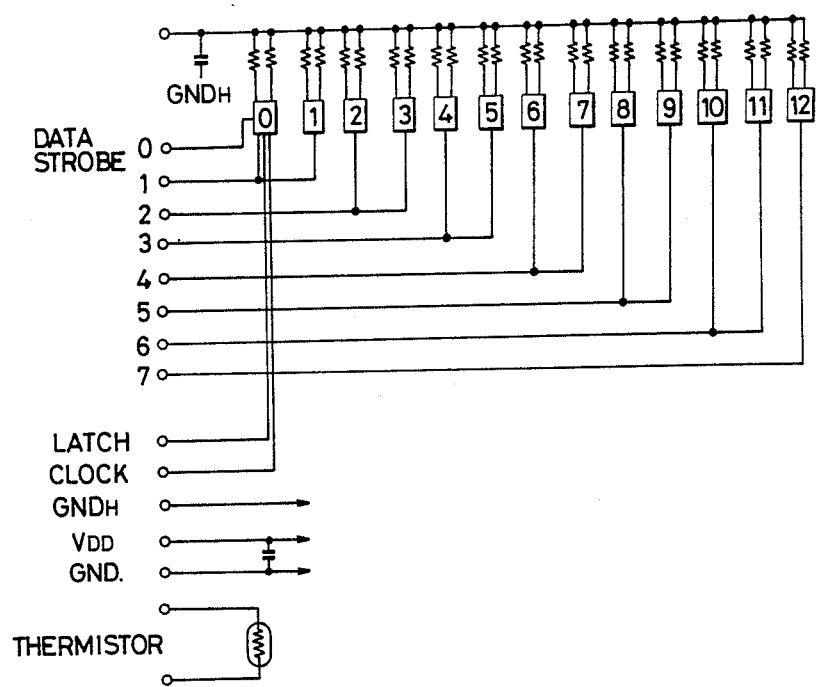
FIG. 11 is a circuit diagram of a thermal head used with the information display medium.

As illustrated in FIG. 11, the thermal head is of a general type including a shift register and a driver. The shift register reads and shift data in response to a clock signal, and, when it reads all data, transfers the data to the driver in response to a latch signal.

When the data is transferred to the driver, it applies heat to the thermal head in response to a strobe signal.

Figure 12:
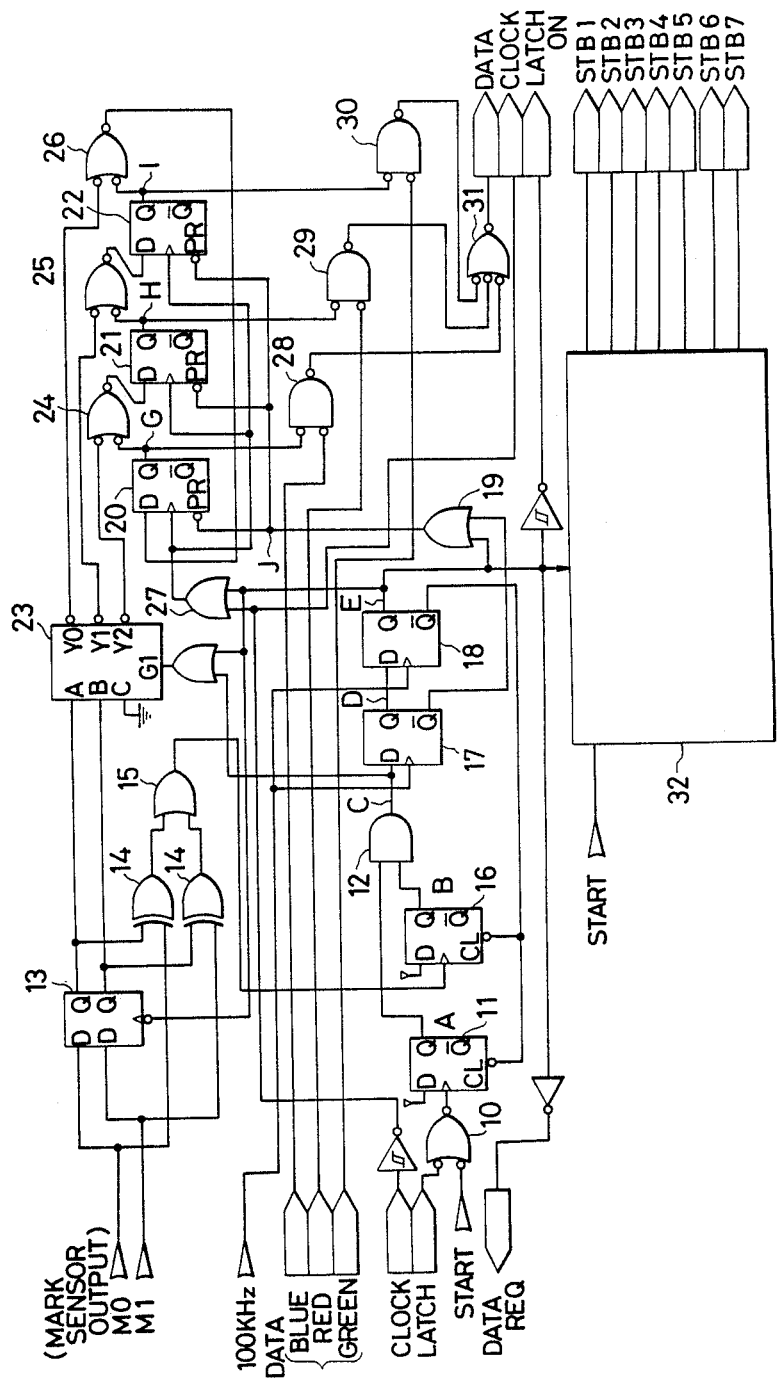
FIG. 12 is a block diagram of a color discrimination circuit and an application time control circuit in the print head controller shown in FIG. 10.
Figure 13:
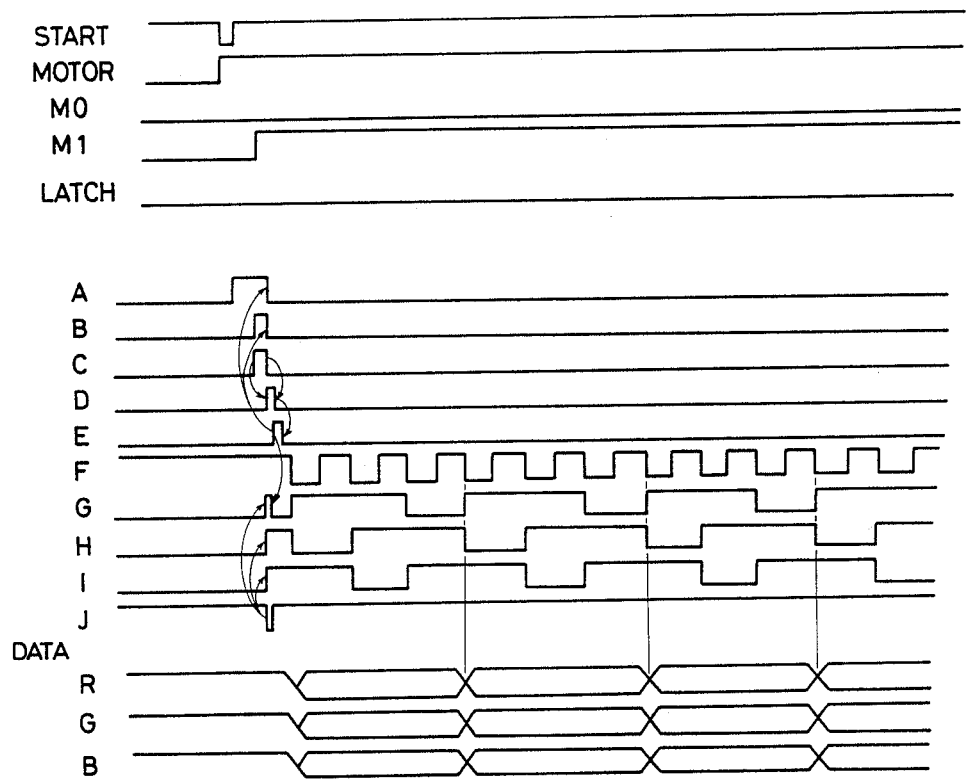
FIG. 13 is a timing chart of operation of the circuits shown in FIG. 12.

The color discrimination circuit and the application time control circuit in the print head controller are constructed as shown in FIG. 12, and operate as shown in the timing chart of FIG. 13.

In FIG. 12, the host device transfers color data for BLUE, RED, GREEN, clock pulses, latch pulses, and a start signal. The clock pulses are used to read and shift the data, and the latch pulses are used to transfer the data from the shift register to the driver in the thermal head when the data is read.

The circuit shown in FIG. 12 controls the thermal head for operating the information display medium in which the colored dots of the colored layer 1C (see FIGS. 1(A) and 1(B)) are displaced one dot per line, as shown in FIG. 5. The circuit selects color data for BLUE, RED, GREEN with respect to one pixel in one line, sent together at a time from the host device, in conformity with the color of the colored layer where the thermal head is positioned and issues the color data corresponding to the colored layer.

More specifically, if the output signals M0, M1 (FIG. 9) from the mark sensor 5 for detecting the line identification marks 3 are low, indicating that the thermal head is positioned at a line beginning with RED, then a clock pulse is applied through an AND gate 10 to a D flip-flop 11 in response to the start signal from the host device to enable the D flip-flop 11 to apply a noninverted output signal A to one input of an AND gate 12.

Since the information display medium 1 is moved by the motor drive in response to the start signal, the mark sensor 5 senses a next line beginning with GREEN, and the output signal or identification signal M0 from the mark sensor 5 remains low and the output signal or identification signal M1 from the mark sensor 5 goes high.

Therefore, the identification signals M0, M1 are applied through a D flip-flop 13 and XOR gates 14 to an OR gate 15. When the identification signals M0, M1 were low, the output signal from the OR gate 15 was low. As the output signals from the XOR gates 14 are changed this time, the output signal from the OR gate 15 goes high, applying a clock pulse to a D flip-flop 16.

In response to this clock signal, the D flip-flop 16 applies a noninverted output signal B to an AND gate 12 which then issues an output signal C that is set in a D flip-flop 17 based on 100-KHz clock pulses. A noninverted output signal D from the D flip-flop 17 is set in a D flip-flop 18 with a one-clock-pulse delay based on the 100-KHz clock pulses, and the D flip-flop 18 issues a noninverted output signal E.

An OR gate 19 ORs the noninverted output signal E from the D flip-flop 18 and the inverted output signal from the D flip-flop 17 to preset D flip-flops 20, 21, 22.

More specifically, as shown in FIG. 13, the output signal J from the OR gate 19 remains high until the noninverted output signal D is issued from the D flip-flop 17 since the inverted output signal from the D flip-flop 17 is high and the noninverted output signal E from the D flip-flop 18 is low. At the time the noninverted output signal D is issued from the D flip-flop 17, the inverted output signal from the D flip-flop 17 and the noninverted output signal E from the D flip-flop 18 go low. As a result, the output signal J from the OR gate 19 goes low, presetting the D flip-flops 20, 21, 22 into a high state.

The output signals M0, M1 from the mark sensor 5 are applied to a decoder 23 to select any one of output terminals Y0, Y1, Y2 thereof.

The output terminals Y0, Y1, Y2 are connected to input terminals, respectively, of AND gates 24, 25, 26 with their output terminals coupled respectively to the data terminals of the D flip-flops 20, 21, 22. The AND gates 24, 25, 26 and the D flip-slops 20, 21, 22 thus connected jointly constitute one type of ring counter.

If the output terminal Y0 of the decoder 23 is selected by the output signals from the mark sensor 5, a low output signal from the AND gate 26 is latched by the D flip-flop 20 which then issues a noninverted output signal G of a low level, in response to an output signal supplied as a clock signal from an OR gate 27 which ORs the noninverted output signal E from the D flip-flop 18 and a clock pulse.

At this time, the D flip-flops 21, 22 keep their noninverted output signals high based on the output signal from the decoder 23 and the clock pulse from the OR gate 27.

OR gates 28, 29, 30 serve to OR the color data from the host device and the noninverted output signals from the D flip-flops 20, 21, 22. The output signals from the OR gates 28, 29, 30 are ORed by an OR gate 31.

More specifically, when the noninverted output signal G from the D flip-flop 20 is low, this output signal G and the color data are ORed by the OR gate 28 which applies a high output signal to the OR gate 31. Since the color data and the noninverted output signals from the D flip-flops 21, 22 are ORed by the other OR gates 29, 30, these OR gates 29, 30 apply low output signals to the OR gate 31. The circuit of FIG. 12 therefore issues a color selection signal for BLUE as data through the OR gate 31 when the output signals M0, M1 are low and high, respectively.

The noninverted output signals from the D flip-flops 20, 21, 22 change their output states per every three clock pulses in response to the clock signal from the host device, as shown in FIG. 13, resulting in the output states moving around the loop. Each color data is selected for one pixel within these clock pulses. In the embodiment, BLUE, RED, and then GREEN color selection signals are issued.

With the colors being thus selected, data to be set in the shift register is repeatedly applied to the thermal head dependent on the color selection.

More specifically, the noninverted output signal E from the D flip-flop 18 is applied to a strobe control circuit 32. Now, the strobe control circuit 32 transfers the color data in the previously selected pattern line which has been set in the shift register to the driver for driving the thermal head based on the strobe signal.

At this time, the noninverted output signal E from the D flip-flop 18 requests the host device for color data for the next pattern line, and the inverted output signal from the D flip-flop 18 clears the D flip-flops 11, 16.

With this arrangement, by setting the output signals from the mark sensor 5 via the decoder 23 into the three cascaded D flip-flops, an initial color pattern line is selected, while color data corresponding to a next color pattern line is requested, for enabling the thermal head to print the data corresponding to the color in the initial pattern line.

Operation of display control of the information display medium 1 with its colored layer having the color pattern as shown in FIG. 6 will be described with reference to FIGS. 14 through 16.

Figure 15:
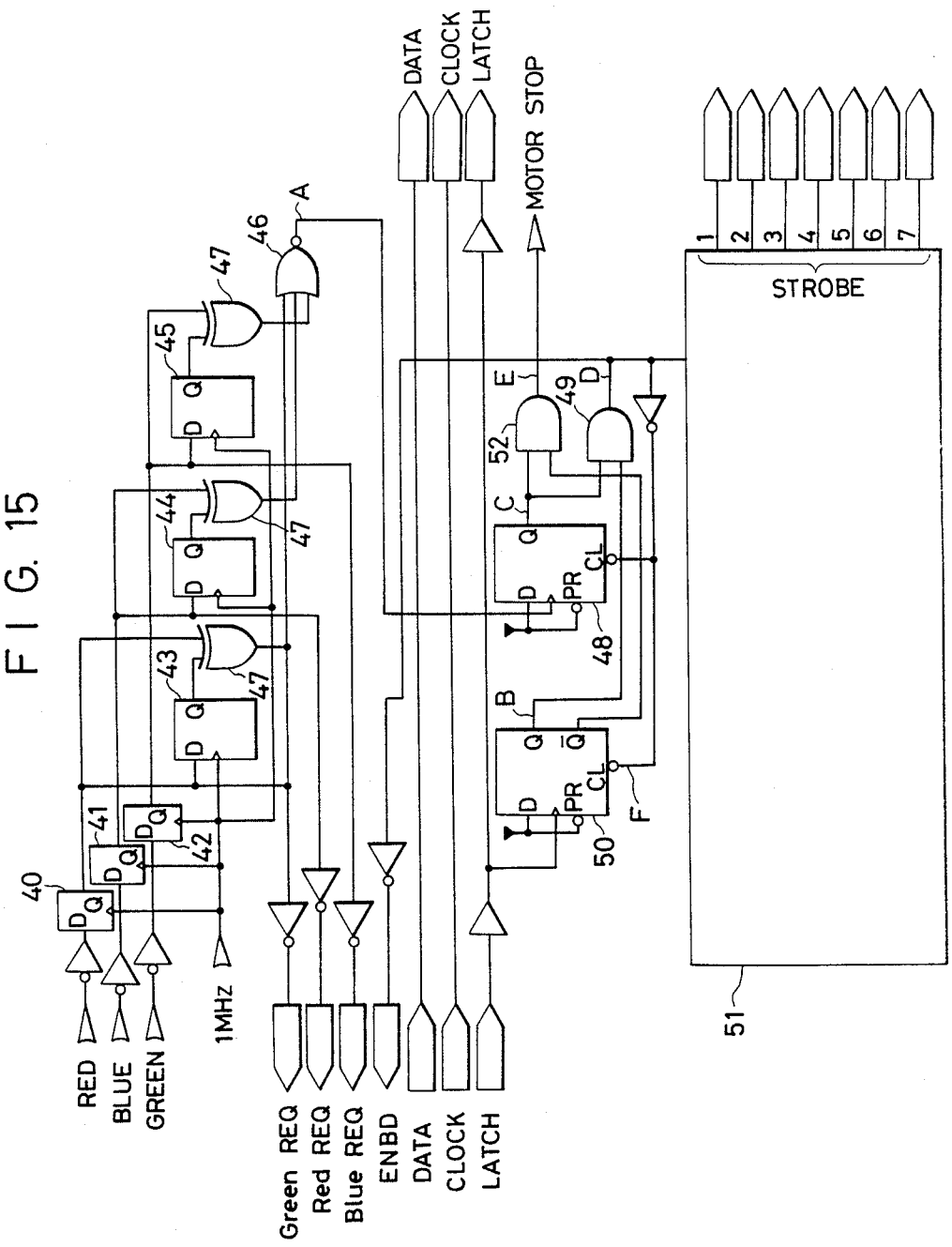
FIG. 15 is a block diagram of a modified application time control circuit.
Figure 16:
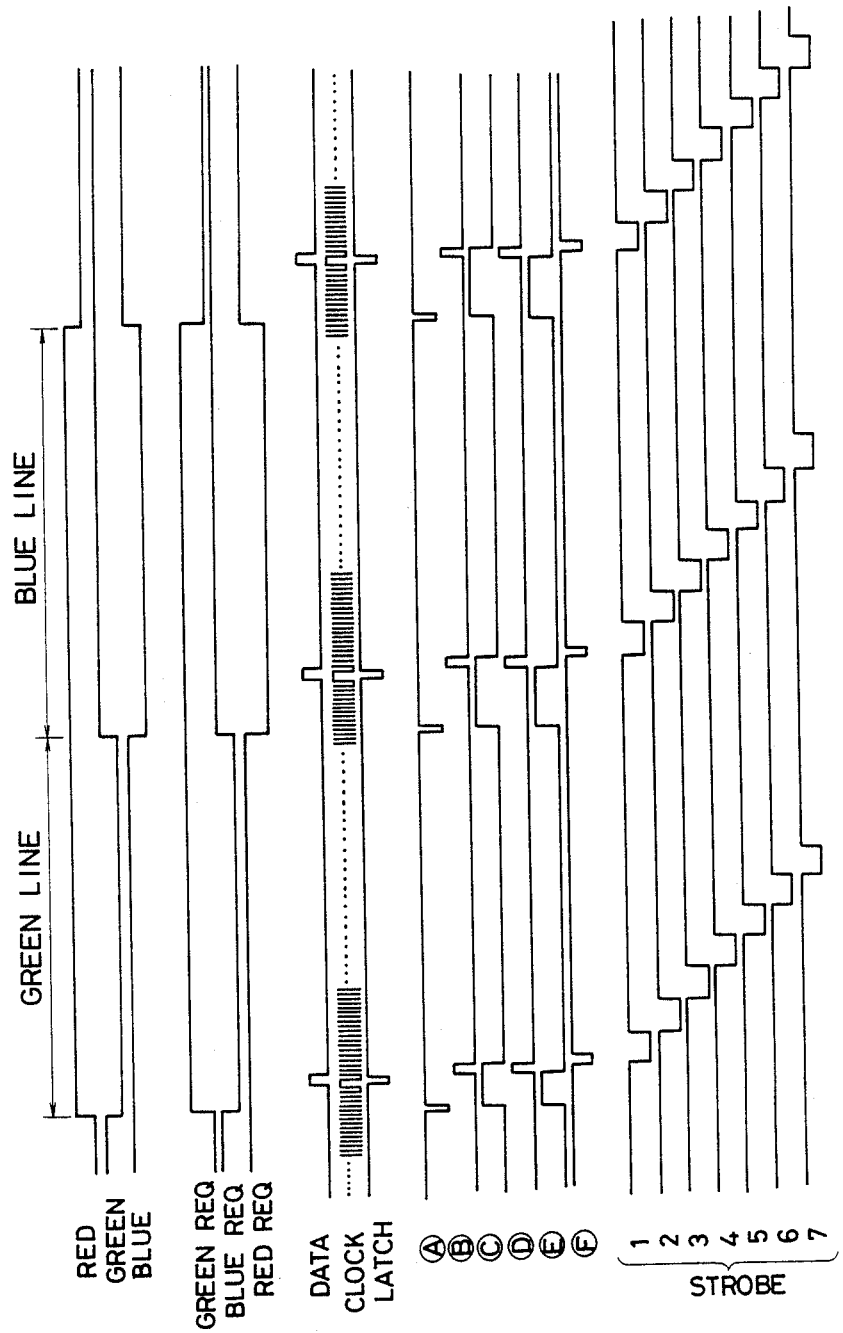
FIG. 16 is a timing chart of operation of the circuit shown in FIG. 15.

FIG. 15 shows in detail the color discrimination circuit shown in FIG. 10, and FIG. 16 is a timing chart of operation of the color discrimination circuit.

Figure 14:
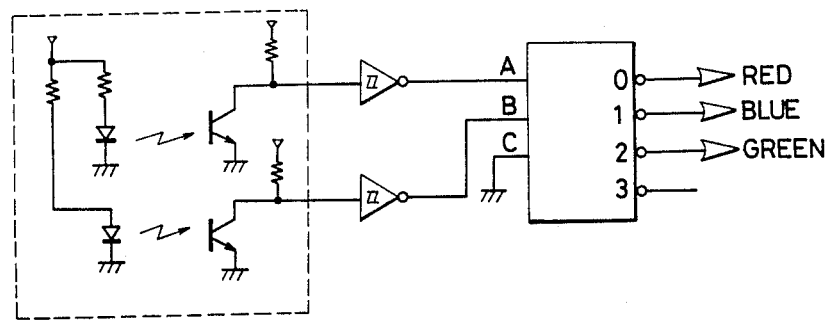
FIG. 14 is a circuit diagram of a modified circuit arrangement for the mark sensor illustrated in FIG. 8.

In FIG. 15, a colored pattern line at which the thermal head is positioned at present is input by a selection signal issued from a decoder in response to output signals from a mark sensor 5 shown in FIG. 14.

More specifically, the selection signal from the decoder is set in any one of D flip-flops 40, 41, 42 by b 1-MHz clock pulses. Noninverted output signals from the D flip-flops 40, 41, 42 are set in respective D flip-flops 43, 44, 45 by 1-MHz clock pulses.

XOR gates 47 exclusive-OR the noninverted output signals from the D flip-flops 40, 41, 42, 43, 44, 45 and issue output signals which are NORed by a NOR gate 46, which applies an output signal A serving as a clock pulse applied to a D flip-flop 48. The D flip-flop 48 applies a noninverted output signal C to an AND gate 49.

The AND gate 49 ANDs the noninverted output signal C and a noninverted output signal B from a D flip-flop 50 supplied with latch pulses as clock pulses, and applies an output signal D to an application time control circuit 51.

The noninverted output signals from the D flip-flops 40, 41, 42 in which the selection signal from the decoder is set are applied to the host device as a command requesting image data corresponding to the color of a pattern line next to the color of the pattern line where the thermal head is presently positioned.

The above circuit arrangement, therefore, while requesting the image data corresponding to the color of a pattern line next to the color selected through the decoder, applies a signal to the application time control circuit for printing the selected color. The application time control circuit transfers data set in the shift register in the thermal head to energize the driver in response to a strobe signal.

The host device, which is requested for the image data corresponding to the color of a pattern line next to the color selected through the decoder, issues the requested data together with as many clock pulses as the number of the pixels of the thermal head, and then issues a latch pulse when all of the data have been issued.

In the circuit arrangement described above, when the latch pulse from the host device and the output signal from the NOR gate 46 are supplied, the thermal head is driven on the basis of the data supplied to the shift register in the thermal head through the application time control circuit. When the latch pulse is issued earlier than the output signal from the NOR gate 46, it only suffices to wait for the output signal from the NOR gate 46. However, if the output signal from the NOR gate were issued earlier than the latch pulse, the information display medium would have been fed before the data transfer is completed, and data for the next line would not completely be read in. To prevent this, the motor operation is controlled by an AND gate 52 which ANDs the output signal from the NOR gate 46 of the color selection system and an inverted output signal from the D flip-flop 50 which is set by a clock pulse in the form of a latch pulse.

As described above, the information display medium having the colored layer displays an image based on the color of the colored layer when the thermosensitive layer is made transparent or turbid. Where such operation of the thermosensitive layer is utilized, the colored layer may be replaced with a background panel combined with the information display medium, the background panel having a colored pattern, similar to that of the colored layer, for color display.

Such an arrangement will be described below.

Figure 17:
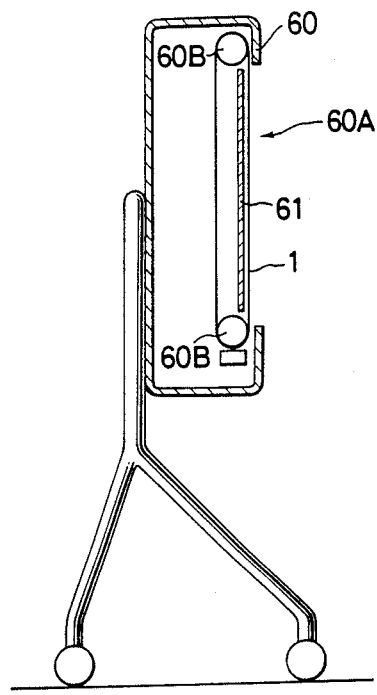
FIG. 17 is a side elevational view, partly in cross section, of a display unit for use with the information display medium of the present.invention.

FIG. 17 shows an information display unit employing a background panel. An information display medium 1 is trained around and movably supported on platens 60B of a display unit 60 having a display window 60A in its front side.

Figure 18:
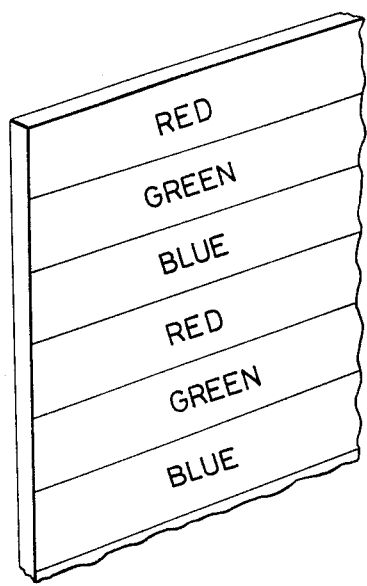
FIGS. 18 and 19 are fragmentary perspective views of background panels.

A background panel 61 is positioned behind the information display medium 1 in opposite relation to the display window 60A. The background panel 61 has on its face a pattern of repetitive stripes of Red, Green, Blue as shown in FIG. 18 or a matrix pattern of colored dots displaced one color per line as shown in FIG. 20.

Figure 19:
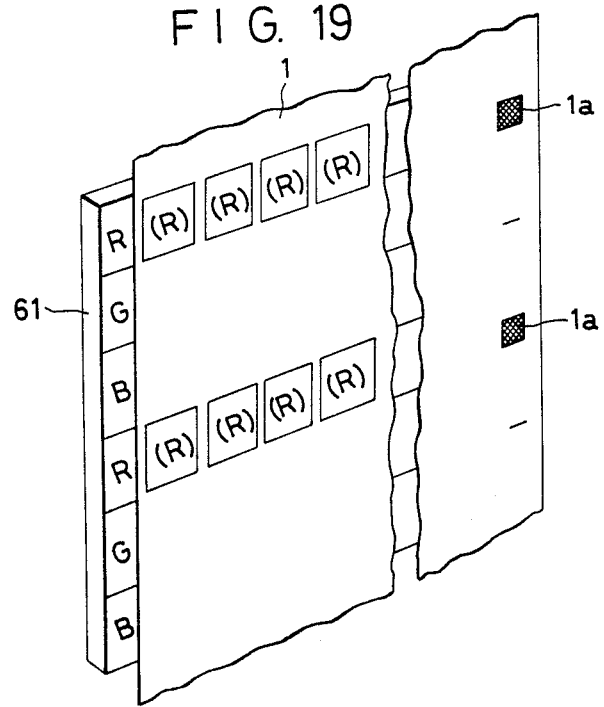

The information display medium 1 does not have the colored layer 1C shown in FIG. 1, and has position marks 1a, coated in black, on one side thereof, as shown in FIG. 19.

The position marks 1a are used to locate the positions where the thermosensitive layer of the information display medium 1 is made transparent with respect to the colors in the colored pattern of the background panel 61 for thereby positioning the information display medium 1 with respect to the background panel 61, and also to determine printing timing of the thermal head with respect to the information display medium 1.

For example, the position marks 1a shown in FIG. 19 are spaced in alignment with the red dots on the background panel 61. For printing, the position marks 1a are identified to record red data. For display, the information display medium 1 can be positioned so that the lines of the marks are aligned with the red dots on the background panel 61.

Figure 22:
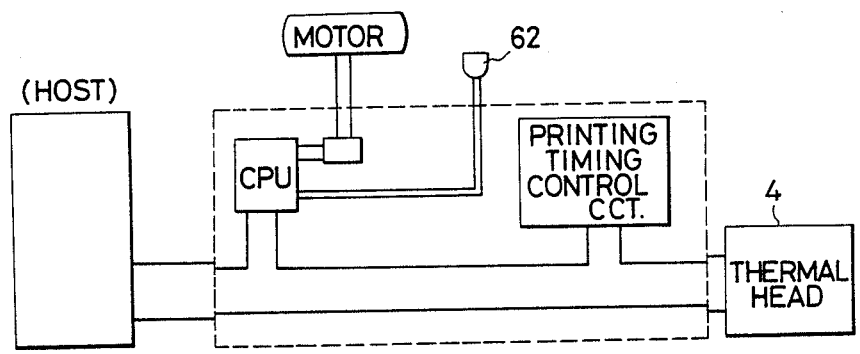
FIG. 22 is a block diagram of a print head controller used with the background panel.

The position marks may be in the form of holes, magnetic marks, electrode plates, or the like, rather than the coated marks as shown, insofar as they can identify the distances between the lines or the color in the initial position on one line as shown in FIG. 20.

Where the background panel having the stripe color pattern as shown in FIG. 18 is employed for printing operation on the information display medium having the position marks, such printing operation is effected on the basis of signals from a position mark sensor 62 connected to a CPU in a print head controller shown in FIG. 22. The printing operation is shown in the flowchart of FIG. 23.

Figure 23:
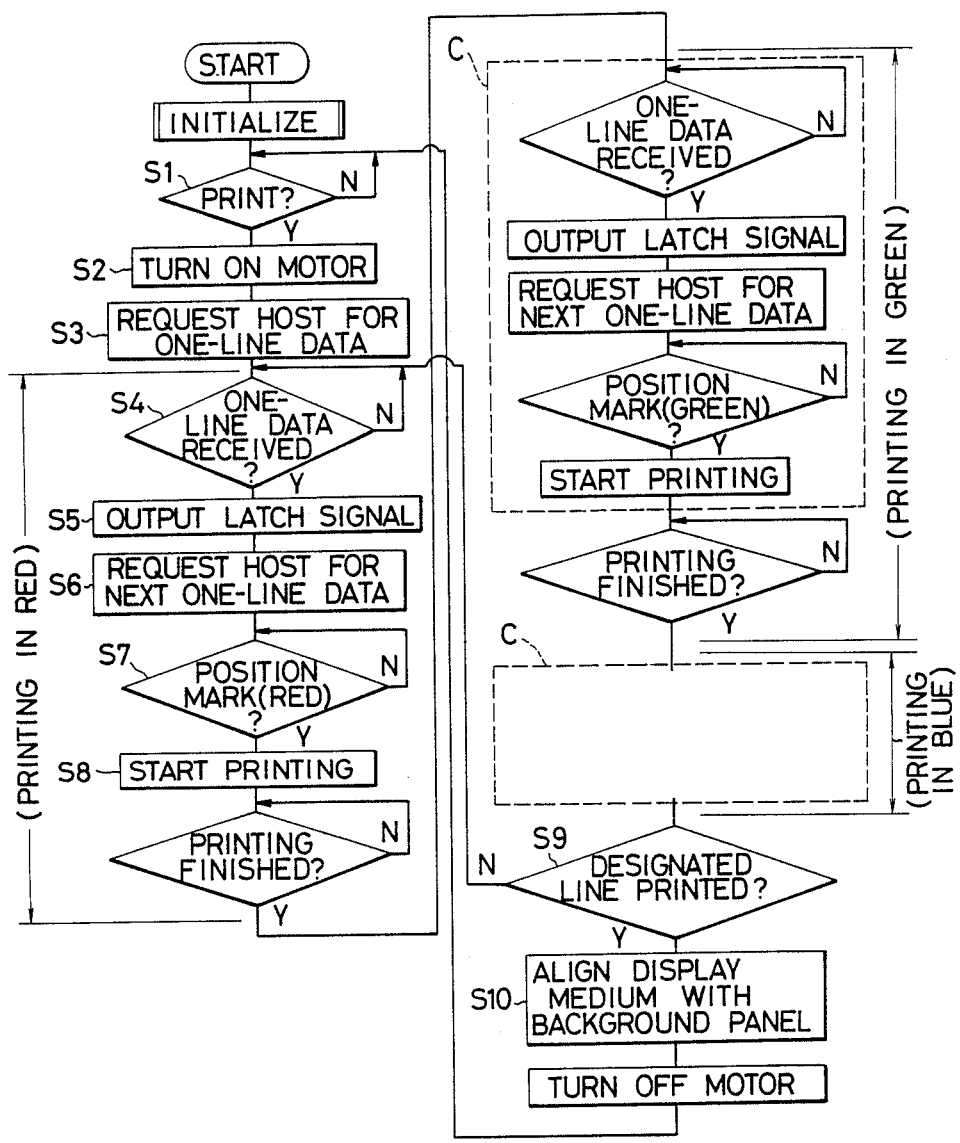
FIG. 23 is a flowchart of operation of the print head controller of FIG. 22 which is used with the background panel shown in FIG. 18.

In FIG. 23, printing operation is identified in step S1, and the information display medium 1 is fed by energizing a motor (not shown) in a step S2, which is followed by step S3 in which the host device is requested for one-line image data.

Step S4 confirms that the one-line image data requested in step S3 is fully received, and then a latch signal is issued in step S5. In a step S6, next one-line data is requested. When a position mark is identified in step S7, the data previously received is printed by the thermal head in step S8.

The above operation is effected for each color. After confirming that a designated line has been printed in step S9, the information display medium 1 is aligned with the background panel for red positions, for example, to achieve positional alignment of the thermosensitive layer printed per line in a step S10.

In the above arrangement, while effecting printing of image data for the colors on a certain line of the thermal line, i.e., making the thermosensitive layer transparent, the image data for the colors on a next line is read into the controller. Therefore, the host device used has an interface capable of issuing the image data for one line upon a request from the controller while awaiting a next request.

In case the background panel having the colored pattern shown in FIG. 20 is employed for display, the initial condition of colors on a line is selected and the data corresponding to the colors on a next line is read in, and then printing corresponding to the initial condition is effected, as with the controller shown in FIGS. 12 and 13.

In the arrangement of FIG. 17, the information display medium 1 is looped around the platens 60B. However, the information display medium 1 may be in the form of a sheet which may be used as a manuscript for an overhead projector (OHP). In such an alternative, an image can be written on the information display medium 1 on the OHP by a print head, for example, so that an image can be formed and displayed.

Although certain preferred embodiments have been shown and described, it should be understood that many changes and modifications may be made therein without departing from the scope of the appended claims.

What is claimed is:

1. An information display medium, comprising:
   a thermosensitive material layer which can reversibly repeat turbid and transparent conditions by being heated to different temperatures and can keep one of said conditions stably below a particular temperature, one of the turbid and transparent conditions being selectable by a thermal print head which makes contact with said information display medium;
   a colored layer, said colored layer interfaced with said thermosensitive material layer;
   a turbid film substrate layer, said turbid film substrate layer interfaced with said colored layer such that said colored layer is sandwiched between said thermosensitive material layer and said turbid film substrate layer;
   a background panel connected to said thermosensitive material;
   at least one of a group consisting of said thermosensitive material layer, said colored layer, said turbid film substrate layer, and said background panel having a colored pattern.

2. An information display medium according to claim 5, wherein:
   said colored pattern comprises an array of dots in at least two colors, each of said dots having a size which is substantially the same as a size of one pixel of the thermal print head.

3. An information display medium according to claim 1, wherein:
   said colored pattern has marks in order to identify particular colors in said colored pattern.

4. An information display medium according to claim 1, wherein:
   said colored pattern is a striped pattern having at least two colors.

5. An information display medium according to claim 1, wherein:
   said colored pattern is a matrix pattern having at least two colors.

6. An information display unit, comprising:

a thermosensitive material layer which can reversibly repeat turbid and transparent conditions by being heated to different temperatures and can keep one of said conditions stably below a particular temperature;

a print head for selecting one of said turbid and transparent conditions connected to said thermosensitive material layer;

a colored layer, said colored layer interfaced with said thermosensitive material layer;

a turbid film substrate layer, said turbid film substrate layer interfaced with said colored layer such that said colored layer is sandwiched between said thermosensitive layer and said turbid film substrate layer;

a background panel connected to said thermosensitive material;

at least said thermosensitive material layer having a colored pattern;

said colored pattern having marks by which to identify colors on said colored pattern;

said print head being able to heat said thermosensitive material based on said marks.

7. An information display unit according to claim 6, wherein:

said colored pattern is a striped pattern having at least two colors.

8. An information display unit according to claim 6, wherein:

said colored pattern is a matrix pattern having at least two colors.

* * * * *